US010547712B2

(12) United States Patent
Agarwal et al.

(10) Patent No.: US 10,547,712 B2
(45) Date of Patent: Jan. 28, 2020

(54) RESERVING PHYSICAL RESOURCES BASED UPON A PHYSICAL IDENTIFIER

(71) Applicant: VMware, Inc., Palo Alto, CA (US)

(72) Inventors: Avinash Agarwal, Bangalore (IN); Sivasubramaniam Sivakumar, Bangalore (IN)

(73) Assignee: VMware, Inc, Palo Alto, CA (US)

( * ) Notice: Subject to any disclaimer, the term of this patent is extended or adjusted under 35 U.S.C. 154(b) by 308 days.

(21) Appl. No.: 15/458,379

(22) Filed: Mar. 14, 2017

(65) Prior Publication Data

US 2018/0270328 A1 Sep. 20, 2018

(51) Int. Cl.
*H04L 29/08* (2006.01)
*G06Q 10/06* (2012.01)
*H04W 4/80* (2018.01)
*H04L 29/06* (2006.01)
*G06F 16/38* (2019.01)
*H04L 29/12* (2006.01)
*H04L 12/58* (2006.01)

(52) U.S. Cl.
CPC ............ *H04L 67/36* (2013.01); *G06F 16/381* (2019.01); *G06Q 10/06314* (2013.01); *H04L 29/08927* (2013.01); *H04L 61/1564* (2013.01); *H04L 63/10* (2013.01); *H04L 63/102* (2013.01); *H04L 67/303* (2013.01); *H04W 4/80* (2018.02); *H04L 51/28* (2013.01)

(58) Field of Classification Search
CPC .. G06Q 10/06; G06Q 10/06314; G06Q 10/10; G06Q 20/3274–3276; H04L 61/00; H04L 61/15; H04L 61/1564; H04L 9/32; H04L 29/08927; H04L 41/28; H04L 51/28; H04L 63/08; H04L 63/10; H04L 63/102; H04L 63/20; H04L 67/303; H04W 4/80; G06F 16/381
See application file for complete search history.

(56) References Cited

U.S. PATENT DOCUMENTS

| | | | |
|---|---|---|---|
| 8,522,977 B1 * | 9/2013 | Britt, Jr. ........... | G06K 19/07327 206/459.1 |
| 9,894,099 B1 * | 2/2018 | Jacobsen ................. | H04L 63/20 |
| 2003/0208386 A1 * | 11/2003 | Brondrup ............... | G06Q 10/02 705/5 |
| 2004/0123153 A1 * | 6/2004 | Wright .................... | G06F 21/32 726/1 |
| 2006/0224675 A1 * | 10/2006 | Fox ........................ | G06Q 10/00 709/206 |
| 2007/0073890 A1 * | 3/2007 | Ritter ..................... | G06Q 10/06 709/229 |

(Continued)

OTHER PUBLICATIONS

HKUST Library. "QR codes for room booking!" YouTube, Mar. 11, 2015, https://www.youtube.com/watch?v=8nY3_1CI7PE.*

(Continued)

*Primary Examiner* — Brendan Y Higa
(74) *Attorney, Agent, or Firm* — Thomas | Horstemeyer, LLP

(57) ABSTRACT

Disclosed are various approaches for facilitating reservation of a physical resource on behalf of a user. A physical identifier can be affixed to a physical resource. A directory service identifier can be embedded within the physical identifier. The directory service identifier can identify an email address or identifier to which reservation requests can be sent.

20 Claims, 8 Drawing Sheets

(56) References Cited

U.S. PATENT DOCUMENTS

| | | | | |
|---|---|---|---|---|
| 2010/0115582 | A1* | 5/2010 | Sapp | H04L 41/0806 726/1 |
| 2013/0059598 | A1* | 3/2013 | Miyagi | H04W 4/023 455/456.1 |
| 2014/0229575 | A1* | 8/2014 | Yamahara | G06Q 10/06 709/217 |
| 2015/0077220 | A1* | 3/2015 | Davis | G07C 9/00571 340/5.7 |
| 2015/0230167 | A1* | 8/2015 | Choi | H04W 4/70 455/411 |
| 2016/0013090 | A1* | 1/2016 | Arneson | H01L 21/67092 414/225.01 |
| 2016/0057248 | A1* | 2/2016 | Tankha | H04L 67/306 726/6 |
| 2016/0337863 | A1* | 11/2016 | Robinson | H04W 12/08 |
| 2016/0352739 | A1* | 12/2016 | McGovern | H04L 63/10 |
| 2018/0131721 | A1* | 5/2018 | Jones | G06F 21/604 |
| 2019/0272688 | A1* | 9/2019 | Sivalingam | G06F 16/9535 |

OTHER PUBLICATIONS

"System and method for Smart access to meeting room" IP.com Oct. 16, 2015.*

* cited by examiner

RESERVING PHYSICAL RESOURCES BASED UPON A PHYSICAL IDENTIFIER

BACKGROUND

In today's environment, smartphones and other devices are becoming more and more ubiquitous and more essential to users. Additionally, in fast-paced office environments, efficient use of meeting rooms and other physical resources is important. The process for booking or reserving a meeting room or other conference facility within a corporate environment can be a cumbersome process. The reservation process can involve sending an email message or calendar invitation to a particular person in charge of booking the resource, who might respond with whether the room is available during a requested window of time.

In other examples, an email message or calendar invitation must be sent to an email inbox that is created for the meeting room, and an automated process can determine whether the room is available and create a calendar entry for the room within a calendar or scheduling system. In either scenario, however, while there exists some degree of automation or convenience, the user must still interact with an email or calendar infrastructure and know the correct email address or meeting room identifier to which a reservation request must be sent.

Additionally, users in a corporate environment may walk up to a meeting room, see that the room is unoccupied, and begin using the room without reserving the room within a reservation or calendar system, only to be kicked out of the meeting room by another user who has reserved the meeting room. This can disrupt workflows and cause inefficiencies in a corporate environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
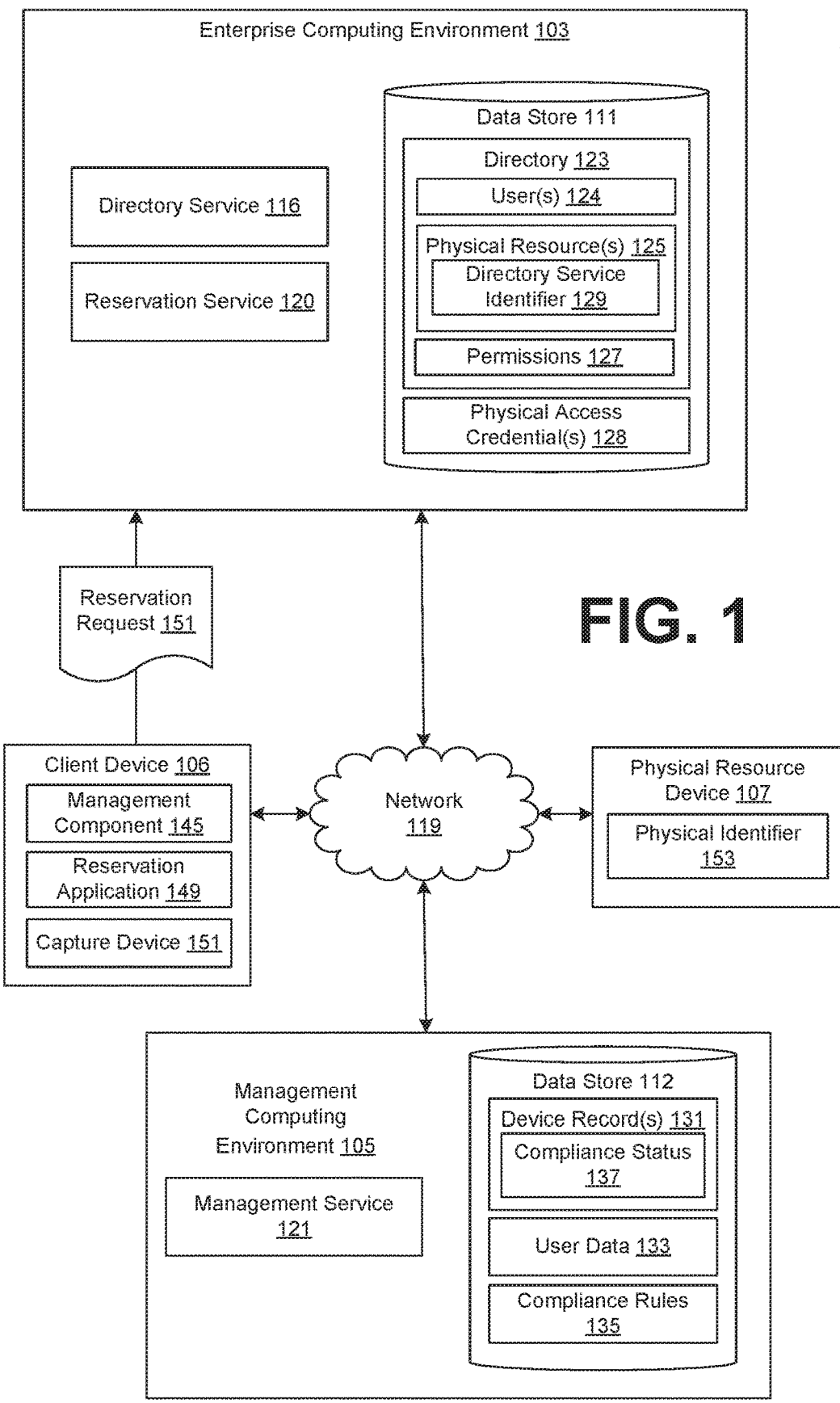
FIG. 1 is a schematic block diagram depicting an example implementation according to various examples of the disclosure.

Disclosed are examples of a system that facilitates reservation of physical resources. Physical resources can include meeting rooms, conference facilities, furniture, or other physical assets that might be located in an office environment. In many office environments, the reservation and booking of meeting rooms is often handled through a directory service and calendaring or scheduling system. In this scenario, an electronic record is created for the meeting room, and a schedule or calendar is assigned to the electronic record. The electronic record is similar in many ways to an object that is created for a user within the directory service. The electronic record is assigned a calendar on which a schedule can be kept, an email inbox to which email messages and calendar invitations can be sent, and other descriptive data or metadata related to the physical resource.

In many office environments, a directory service is used to facilitate providing electronic services to users, such as email, calendar and scheduling, printing, user authentication, and other services. Accordingly, because users are familiar with the services used in such an environment, IT administrators can incorporate the scheduling of physical resources, such as meeting rooms, into the environment. If a user wishes to reserve a meeting room, for example, the user can send a meeting request using an email or calendar client to an email address that corresponds to the physical resource. An automated process can determine whether the physical resource is reserved during the requested time window and generate a response to the request. The response can be an indication that the resource has been successfully reserved for the requesting user or indicate that the resource is already booked or that the user does not have sufficient permissions to book or reserve the resource.

The electronic record of a physical resource can be associated with an identifier within the directory service with which the physical resource is identified. The directory service identifier can be an email address, username, or other identifier that uniquely identifies the physical resource within the directory service. In some cases, the directory service identifier can be different from the email address used to book the resource or map to the email address within the directory service. The electronic record can also include permissions associated with the electronic record that identify particular users or user groups within the directory service that are permitted to use, access, or reserve a physical resource.

Accordingly, a physical identifier, such as a barcode, a near-field communication (NFC) tag, or other identifier, can be affixed on or near the physical resource. For example, a barcode can be printed on a placard or sign that identifies the name of a meeting room. A directory service identifier, such as an email address corresponding to the electronic record within the directory service, can be embedded within the identifier. To book or reserve a meeting room, a user can scan or capture the physical identifier using an application on his or her smartphone. The application can facilitate creation of a reservation request, such as a calendar invitation, which can be sent to a reservation service, which can book or reserve the meeting room on behalf of the user.

Therefore, examples of the disclosure can streamline the process of reserving a physical resource within an office environment so that users need not know or key in the directory service identifier corresponding to the meeting room. Instead, the user can reserve the meeting room by scanning the physical identifier, such as a barcode, with a smartphone application, and then perform a few taps or gestures in a smartphone application.

FIG. 1 illustrates an example of a networked environment 100 according to examples of the disclosure. In the depicted network environment 100, an enterprise computing environment 103 is in communication with at least one client device 106 and optionally a management computing environment 105 or physical resource device 107 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 and management computing environment 105 can be a computing environment that is operated by an enterprise, such as a business or other organization. The enterprise computing environment 103 and management computing environment 105 include a computing device, such as a server computer, that provides computing capabilities. Alternatively, the enterprise computing environment 103 and management computing environment 105 can employ multiple computing devices that are arranged in one or more server banks or computer banks. In one example, the computing devices can be located in a single installation. In another example, the computing devices for the enterprise computing environment 103 and management computing environment 105 can be distributed among multiple different geographical locations. In one case, the enterprise computing environment 103 and management computing environment 105 include multiple computing devices that together can form a hosted computing resource or a grid computing resource. Additionally, the enterprise computing environment 103 and management computing environment 105 can operate as an elastic computing resource where the allotted capacity of computing-related resources, such as processing resources, network resources, and storage resources, can vary over time. In other examples, the enterprise computing environment 103 and management computing environment 105 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include directory service 116, a reservation service 120, and other applications, services, processes, systems, engines, or functionality not discussed in detail herein. The directory service 116 can include a service such as Microsoft Active Directory® that maintains user information and associates an identity with network resources such as electronic mailboxes, calendars, files, devices, or other resources. The directory service 116 provides authentication of users and associates the user's identity with the various resources that are provided within a corporate network infrastructure, such as a single sign-on service, email, calendar, contacts, file storage, print services, network access, and others.

The reservation service 120 can include a special purpose service or application that can facilitate reservation of physical resources within an office environment. In some implementations, the reservation service 120 can be a portion of an email or calendar service that is accessed by users using an email or calendar client to access emails, calendar invitations, or other items that appear on the user's calendar. In one example, the reservation service 120 can receive requests to book or reserve a physical resource like a meeting room, determine whether the resource is available at the requested time window and provide a response to the requesting user or device indicating whether the resource is available to the requesting user or device and whether the resource has been booked or reserved by the reservation service 120 on behalf of the requesting user or device.

In some implementations, the reservation functionality of the reservation service 120 can be performed by a calendar service that determines whether the physical resource is available at a requested time, date, and duration. In this example, a physical resource can be associated with its own calendar or schedule just like another user having an identity within the directory service 116, and the physical resource can be booked just like any other users can schedule a meeting with one another using a calendar service. In contrast to a user determining whether his or her schedule maintained within a calendar service permits a meeting to be scheduled, the reservation service 120 can make an automated determination based upon calendar data or a schedule associated with an electronic record of the physical resource within the directory service 116.

In some implementations or in certain cases, devices associated with users in a corporate environment can be managed devices that are enrolled with a management service 121. The management service 121 can be executed by the enterprise computing environment 103 in an on-premises implementation or in another computing environment, such as a management computing environment 105 that is separate from the enterprise computing environment 103. The management service 121 can also be provided with access to information about users 124, physical resources 125, physical access credentials 128, or other data associated with the directory service 116 or the reservation service 120.

The management service 121 can be executed in the management computing environment 105 to monitor and oversee the operation of one or more client devices 106 by administrators. In some examples, the management service 121 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 121. The management service 121 can initiate installation of applications as managed applications. The management service 121 can also initiate installation of configuration profiles that can be accessed by certain applications installed on a client device 106.

The management service 121 can include a management console that can allow administrators to manage client devices 106 that are enrolled with the management service 121. User interfaces can allow an administrator to define policies for a user account or client devices 106 associated with an enterprise environment. The user interfaces can also include, for example, presentations of statistics or other information regarding the client devices 106 that can be managed by the management service 121.

The data stored in the data store 111 associated with the directory service 116 can include a directory 123. The directory 123 can include the various objects and data structures that are maintained by the directory service 116. Objects within the directory 123 can be organized into data structures, such as forests, trees, domains, organizational units, groups, partitions, or other organizational structures depending upon the directory service 116. Additionally, the directory 123 can be replicated across more than one data store 111 for redundancy purposes. The inner-workings and specific structure of the directory 123 are not shown or discussed herein, as they are not necessary for an understanding of examples of this disclosure.

Within a directory 123, electronic records or objects corresponding to users 124 or user accounts can be created and stored. A user 124 can correspond to a user having an identity within the directory service 116. Data associated with the user 124 can also be stored in the directory 123 or in locations on a network specified by the directory 123. The data can include an email inbox, calendar data, documents or files, and other data stored by or associated with a particular user 124. In some examples, users 124 can be grouped into user groups by location, job function, or other grouping factors.

In the context of this disclosure, a physical resource 125 can be associated with an electronic record in the directory 123. A physical resource 125 in the directory 123 can correspond to a meeting room, a conference facility, or another physical resource to which a physical identifier, such as a barcode or NFC tag, can be attached. The directory 123 can further define various permissions 127 for the objects within the directory 123. The electronic record associated with the physical resource 125 can specify metadata describing the physical resource 125. For example, a meeting room name, location, resources within a meeting room, and other metadata can be stored in the electronic record. Additionally, a schedule and mailbox can also be stored within the electronic record or a location specified for the physical resource 125. The mailbox can be an electronic mailbox to which reservation requests can be sent, and the schedule can include a schedule that is defined and formatted according to an enterprise calendar system, for example.

A physical resource 125, in some examples, can also be associated with one or more directory service identifiers 129. A directory service identifier 129 can include an email address, username, or other identifier that uniquely identifies a physical resource 125 within the directory 123. The directory service identifier 129 can include or be mapped to a destination address, such as an email address, to which reservation requests can be sent by requesting users or requesting devices that are requesting to reserve a particular physical resource 125.

Permissions 127 can relate one object in the directory to another and define, for example, whether a particular user or user group is permitted to reserve or book a physical resource 125. Additionally, a permission 127 can also specify whether additional rules or requirements should be applied whenever booking or reserving a physical resource 125 on behalf of a user 124. For example, a permission 127 can specify whether additional rules regarding compliance of a user's device with compliance policies are required in order for a physical resource 125 to be reserved.

A physical access credential 128 can represent a credential or token that can be stored on a client device 106, such as in a secure element or storage of the client device 106, that can also be presented to a door lock actuator, access credential reader, or other mechanism for securing a physical resource. In one example, if the reservation service 120 reserves a physical resource 125 on behalf of a user or a client device 106, a physical access credential 128 can be provided to the client device 106, which can present the credential to access the physical resource 125. For example, the physical access credential 128 can be a token that is presented using an RFID or NFC capability of the client device 106 to a proximity card reader that communicates with a door lock actuator of the physical resource 125.

The data stored in the data store 112 associated with the management service 121 can include device records 131, user data 133, compliance rules 135, and potentially other data. Device records 131 can correspond to client devices 106 that are enrolled as managed devices with the management service 121. A device record 131 can include various security settings selected for enforcement on a client device 106 that is enrolled with the management service 121. Accordingly, a device record 131 can include a device identifier associated with a device, such as the client device 106, one or more device certificates, a compliance status 137, and other data. In some examples, a device record 131 can also identify a user associated with a particular client device 106. The compliance status 137 can indicate whether a particular client device 106 is in compliance with one or more compliance rules 135.

More specifically, the device record 131 can include one or more of: data describing the identity, type and components of the client device 106; data describing the state of the client device 106; data describing organizational groups to which the client device 106 belongs; data describing compliance rules 135 with which the client device 106 must comply; data describing management policies that specify if, when, and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 121), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera, touchscreen, keyboard, mouse, printer). More particularly, a device record 131 associated with a client device 106 comprising a network connection television can specify that the client device 106 is a device type of phone, that the client device 106 has an active connection to the Internet, and that the client device 106 has a camera enabled.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 121, whether the client device 106 is in a state of compliance with any applicable compliance rules 135, and whether any remedial actions have been (or are to be) taken as a result of a noncompliance with any applicable compliance rules 135. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record 131 can include data describing a command queue associated with the client device 106. For example, the management service 113 can maintain a command queue of commands that are designated for execution against the client device 106. As described herein, a client device 106 can be provisioned by the management service 121 by causing resources to be installed or stored on the client device 106. To implement such process, the management service 121 can store a command related to provisioning in the command queue. Additionally, the management service 121 can store a command related to a remedial action associated with a compliance rule 135 in the command queue, in the event that it is determined that a rule condition associated with the compliance rule 125 has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Finally, data describing compliance rules 135 with which the client device 106 must comply can, for instance, specify one or more security policies to which the client device 106 must adhere, a compliance status 137 of the client device 106, and one or more remedial actions that should be performed in the event that an associated rule condition occurs, as described later herein. In some embodiments, the data describing compliance rules 135 and the data describing management policies 133 are obtained from an organizational record associated with an organizational group 126 to which the client device 106 is a member (i.e., the compliance rules 135 associated with the organizational group 126 are reflected in the device record of the member client device 106).

A compliance status 137 of a client device 106 represents whether the device is in compliance with one or more compliance rules 135. Various compliance rules 135 can be enforced on the client device 106 by the management service 121. Compliance rules 135 can be based on time, geographical location, or device and network properties. For instance, the client device 106 can satisfy a compliance rule 135 when the client device 106 is located within a particular geographic location. The client device 106 can satisfy a compliance rule 135 in other examples when the client device 106 is in communication with a particular local area network, such as a particular local area network that is managed by the computing environment 203. Furthermore, a compliance rule 135 in another example can be based upon the time and date matching specified values.

A compliance rule 135 can specify that a client device 106 is required to be powered off or be in a low power "sleep" state during a specified time period. Another compliance rule 135 can specify that a client device 106 is required to be powered on or be in a normal operation "awake" state during a specified time period. As another example, a compliance rule 135 can specify that a client device 106 is prohibited from rendering content that has been designated as confidential. A compliance rule 135 can also specify whether a camera associated with the client device 106 must be enabled or disabled. The compliance rule 135 can also specify certain times of the day, week, or year in which certain hardware or software features are permitted to be enabled or disabled.

Another example of a compliance rule 135 involves whether a user belongs to a particular user group. For instance, a compliance rule 135 can include a whitelist or a blacklist that specifies whether particular users or groups of users are authorized to perform various functionalities, such as installing or executing a particular application.

Other examples of compliance rules 135 include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule 135 can specify that the client device 106 is required to authenticate a user using a password or personal identification number (PIN) in order to unlock the client device 106.

A compliance rule 135 can also require that the client device 106 has device encryption enabled, where data stored on the device is stored in an encrypted form. The data can be encrypted by a device certificate. A compliance rule 135 can also require that the client device 106 be enrolled with the management service 121 as a managed device. Another compliance rule 135 can specify that the user is required to accept the terms of service that are presented by the management component 145 on the client device 106. As another example, a compliance rule 135 can specify that the management component 145 is required to periodically communicate or "check-in" with the management service 121 to report on its status. If a threshold amount of time has elapsed since the previous check-in of the client device 106, the client device 106 can be considered to have violated this compliance rule 135.

Another compliance rule 135 can specify that a client device 106 run one of a specified variant or version of a particular operating system. A compliance rule 135 can also specify that an enrolled device be manufactured by a particular manufacturer or have a particular manufacturer identifier. Another compliance rule 135 can specify that an enrolled device be a particular model name or model number. A client device 106 can also be considered out of compliance if the device is in a data roaming mode or has used a threshold amount of a periodic network data usage allowance.

A compliance rule 135 can also identify a list of required applications that must be installed on the client device 106 or a list of forbidden applications that cannot be installed on the client device 106. The management component 145 can remove a forbidden application or install a missing required application on the client device 106 in response to detecting a violation of such a compliance rule 135. A compliance rule 135 can also require the presence of a mobile device management (MDM) profile, an MDM storage area, an application profile, and/or a configuration profile. The management component 145 can obtain and store missing required data or containers on the client device 106 in response to detecting a violation of such a compliance rule 135.

Therefore, the compliance status 137 indicates whether and to what extent a particular client device 106 is compliant with compliance rules 135 assigned to the client device 106 by the management service 121. The compliance status 137 can be determined by a management component 145 on the client device 106 that analyzes the status of the client device 106 and reports compliance to the management service 121. In other examples, the compliance status 137 can be determined by the management service 121 based upon state information describing the client device 106, which can be reported by the management component 145. The compliance status 137 can also include the state of various hardware or software features of the client device 106 without respect to whether the status of the features are determined by a compliance rule 135.

User data 133 contains information about users who are associated with client devices 106 that are enrolled with the management service 121. User data 133 can include profile information about a user, authentication information about a user, applications that are installed on client devices 106 associated with the user, and other user information. For example, user data 133 can include information about client devices 106 that are associated with a user account of the user, enterprise resources to which a particular user has access, such as email, calendar data, documents, media, applications, network sites, or other resources. The user data 133 can also identify one or more user groups of which a particular user is a member, which can in turn define the access rights of the user to one or more enterprise resources as well as identify which applications should be deployed to a client device 106 associated with the user. To this end, the user data 133 can further identify one or more device identifiers that can uniquely identify client devices 106 that are associated with a user account of the user. In some implementations, some of the user data 133 can be stored by or in locations specified by the directory service 116 rather than in the data store 112 associated with the management service 121.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 121 as a managed device of the enterprise. In some implementations, the client device 106 can be an unmanaged device that is not enrolled with a management service 121.

In one implementation, the client device 106 can execute a management component 145 that can communicate with the management service 121 to facilitate management of the client device 106. The management component 145 can communicate with the management service 121 to enforce management policies and compliance rules on the client device 106. For example, the management component 145 can enforce data security requirements, install, remove or update security certificates, or write, modify or delete certain data from the client device 106. The management component 145 can also monitor the client device 106, generate state information describing the client device 106, and provide the management service 121 with such state information. For example, the state information can include network activity of the client device 106, the location of the client device 106, whether enforce password or personal identification number (PIN) authentication is enforced, and/or whether other compliance rules 135 are being complied with by the client device 106. In one example, the state information can be generated by the management component 145 by receiving compliance rules 135 from the management service 121 over the network 119, comparing the state of the client device 106 to the compliance rules 135, and determining whether the client device 106 fails to satisfy the compliance rules 135.

To carry out local management of a client device 106, the management component 145 can be installed and executed with elevated or administrative privileges on the client device 106. In some scenarios, the operating system of the client device 106 can allow a particular application or package to be identified as a device owner or a device administrator, which can in turn configure the client device 106 using such privileges.

The client device 106 can also execute a reservation application 149. The reservation application 149 can capture a physical identifier corresponding to a physical resource 125. The physical identifier can be a barcode, NFC tag, RFID tag, or other form of identifier, that is affixed to or near a physical resource, such as meeting room. The directory service identifier 129 corresponding to the physical resource 125 can be embedded within the physical identifier. For example, an email address or directory service 116 identifier can be encoded or embedded within the physical identifier. The directory service 116 identifier can be encoded within the physical identifier in an encrypted or unencrypted form.

The reservation application 149 can facilitate reservation of the physical resource 125 at a requested time on behalf of a user of the client device 106, as will be described in further detail below. The client device 106 further includes a capture device 151. The capture device 151 can include a camera, NFC reader, RFID reader, or another input device that can capture a physical identifier.

In some implementations, one or more physical resource devices 107 can be in communication with the network. A physical resource device 107 can include a device that can house or display a physical identifier 153 corresponding to a physical resource. In one example, a barcode in which a directory service identifier 129 is embedded can be shown on a display of the physical resource device 107. In another example, an NFC or RFIC tag can be embedded within the physical resource device 107 so that a capture device 151 can capture the physical identifier 153 and extract a directory service identifier 129. A physical identifier 153 can also include alphanumeric text that specifies or maps to the directory service identifier 129, which can be captured by the capture device 151 and recognized through a text recognition capability of the reservation application 149.

In some implementations, the physical resource device 107 can also include a physical access component, such as a door lock actuator or other access control mechanism that can control access to the physical resource. In other implementations, the physical access component can be separate from the physical identifier 153. In yet other implementations, the physical identifier 153 need not be a device that communicates with the network 119. For example, a physical identifier 153 can simply be affixed to a door of a meeting room, for example. In this case, the physical identifier 153 can be a barcode, NFC tag, or RFID tag that is printed or attached to any surface on or near the physical resource.

Figure 2:
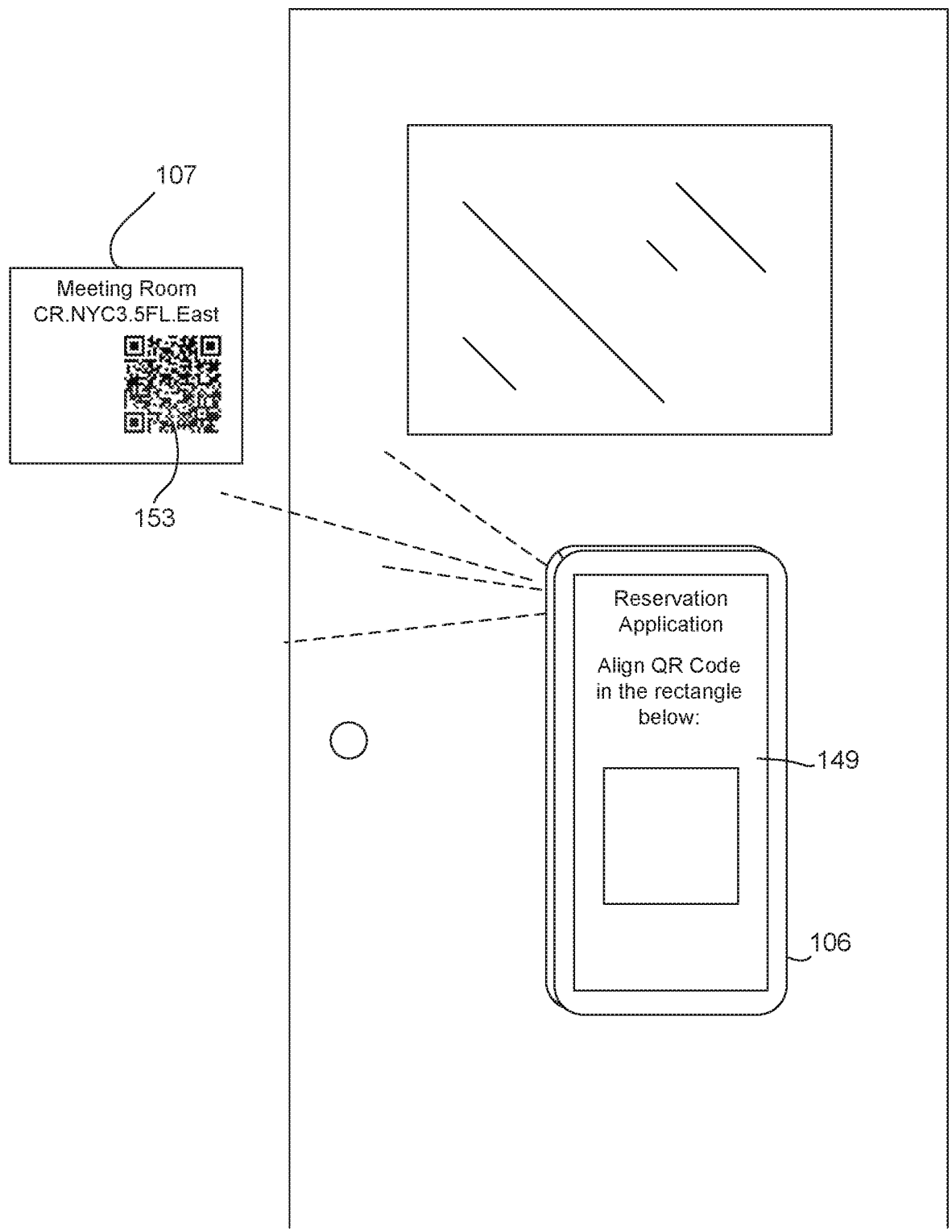
FIGS. 2-8 are examples of the reservation application executed by a client device according to examples of the disclosure.

Referring next to FIG. 2, shown is an example of a reservation application 149 executed by a client device 106 that can facilitate reservation of a physical resource 125. In the example of FIG. 2, a physical resource device 107 can display a physical identifier 153 corresponding to the physical resource 125. The physical resource device 107 can include a placard or display that displays a barcode. The physical identifier 153 can include a barcode in which the directory service identifier 129 is embedded or encoded. For example, an email address or other identifier that identifies the physical resource 125 within the directory service 116 can be embedded within the physical identifier 152 in encrypted or plaintext form.

Accordingly, to book or reserve a conference room to which the physical identifier 153 corresponds, the user can launch the reservation application 149 on his or her client device 106. The reservation application 149 can integrate with the capture device 151 that is integrated into or linked to the client device 106. In the depicted example, the reservation application 149 can instruct the user to capture the physical identifier 153 from the physical resource device 107. As noted above, the physical identifier 153 can specify the directory service identifier 129 of the meeting room or conference facility to ease the reservation process for the user.

Figure 3:
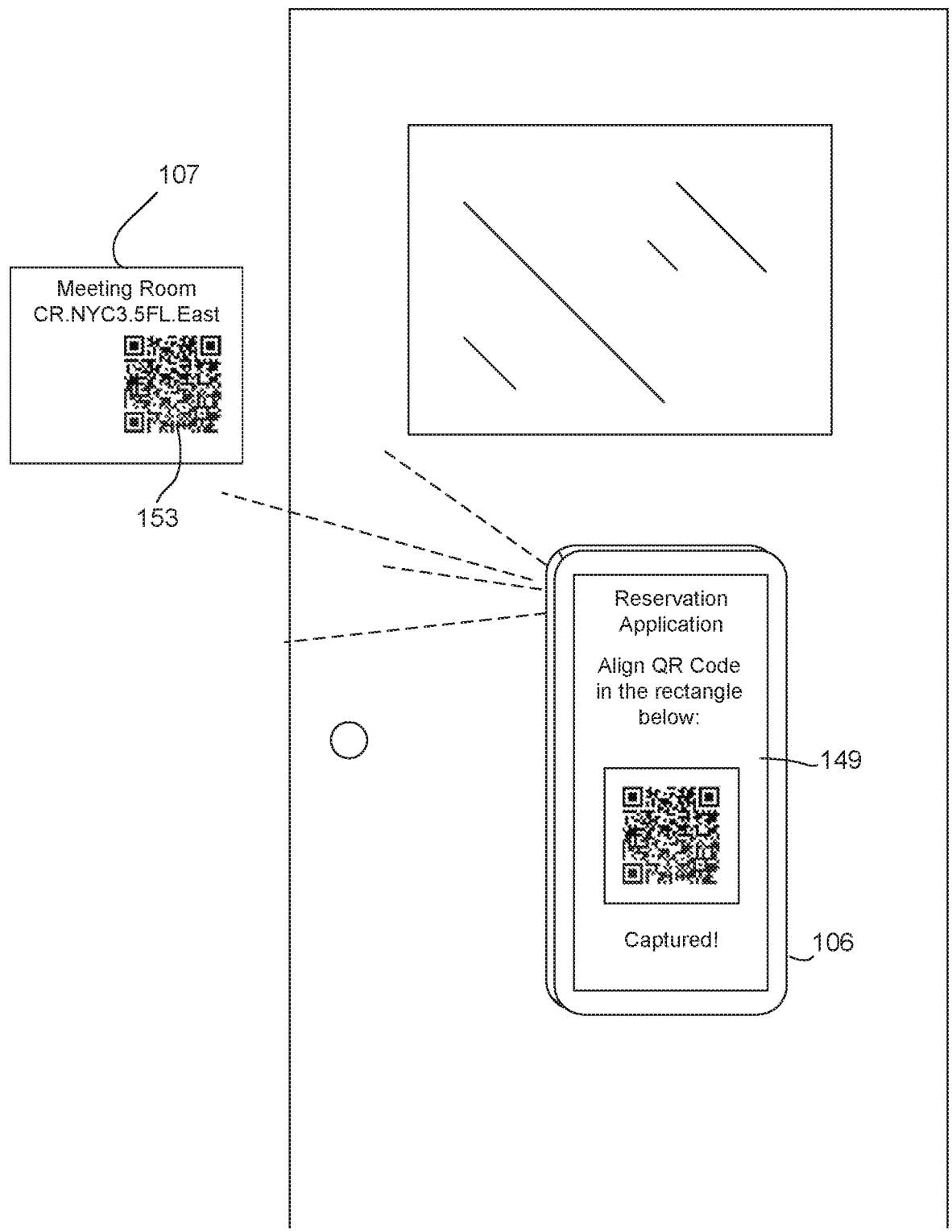

Continuing the example of FIG. 2, reference is made to FIG. 3. As shown in FIG. 3, the reservation application 149 has captured the physical identifier 153 from the physical resource device 107. The reservation application 149 can capture the physical identifier 153 using the capture device 151 that is integrated within the client device 106. Upon capturing the physical identifier 153, the reservation application 149 can then facilitate reservation of the meeting room on behalf of a user associated with the client device 106.

In some examples, the physical identifier 153 can be rendered on a display and change according to the current time. In this scenario, the physical identifier 153 can also be embedded with indicates a window of time for which the physical resource 125 can be booked. For example, the physical identifier 153 can include the next available window of time at which the physical resource 125 can be reserved. In another example, the physical identifier 153 can be encoded by the physical resource device 107 a default time period that the user can then request through a subsequent email or request from the reservation application 149 without regard to the availability of the physical resource 125. For example, the physical identifier 153 can be encoded with a 30 or 60 minute time period beginning at the start of the next hour or half-hour. In this scenario, if the current time is 12:23 PM, the physical identifier 153 can be encoded with a default start time for a reservation request of 12:30 PM.

Figure 4:
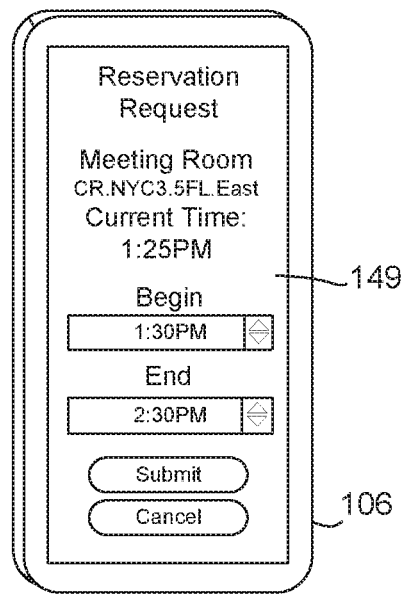

Continuing the example of FIG. 3, reference is made to FIG. 4. In the example of FIG. 4, the reservation application 149, upon capturing the physical identifier 153 associated with the physical resource 125, can render a reservation user interface through which a user can submit a reservation request to the reservation service 120. The reservation application 149 can generate the reservation user interface with a default beginning time and ending time that is based upon a current timestamp or a default time window that is embedded within the physical identifier 153. Additionally, the reservation user interface can display identifying information about the physical resource 125, which can be embedded within the physical identifier 153 or retrieved from the directory service 116 based upon a query that is generated using the directory service identifier 129. The reservation user interface can also allow the user to edit the beginning time and/or ending time for which the physical resource is requested.

Additionally, the reservation user interface can allow the user to modify a starting time or ending time associated with a request to reserve a physical resource 125. In some implementations, the reservation user interface can allow the user to add other users to a reservation request. The other users can receive an email, a meeting request, or other form or notification generated by the reservation service 120 in response to being added to a reservation request that is submitted to the reservation service 120.

Accordingly, the reservation user interface shown in FIG. 4 can allow the user to submit the reservation request to the reservation service 120, which can determine whether the physical resource 125 is available to be reserved by the requesting user or the requesting client device 106 at the requested time. The reservation service 120 can make this determination based upon the availability of the requested physical resource 125 corresponding to the directory service identifier 129 that is embedded within the physical identifier 153 captured by the reservation application 149.

Figure 5:
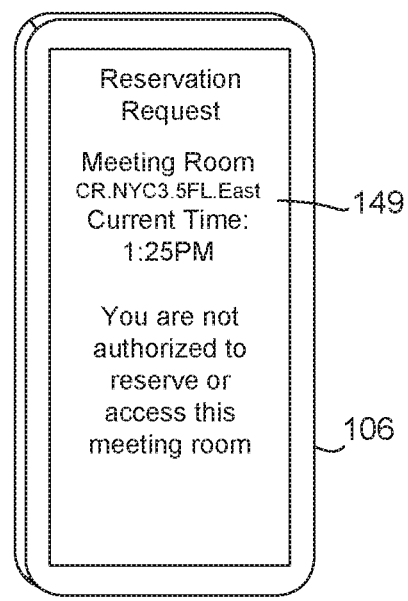

Continuing the example of FIG. 4, reference is made to FIG. 5. In the user interface shown in FIG. 5, the reservation application 149 has submitted a reservation request to the reservation service 120. In the example of FIG. 5, the reservation service 120 has determined based upon the availability or the permissions 127 associated with the physical resource 125, that the requesting user is not authorized to reserve or access the requested physical resource 125. In some examples, a particular physical resource 125 can be configured such that it is only available to reserve by select users within the directory service 116. Accordingly, the reservation application 149 can obtain a response indicating that the user is unauthorized and display the response to the user.

In some implementations, the reservation service 120 can also obtain information about the compliance status 137 of the client device 106 and deny a reservation request based upon the compliance of the user or client device 106 with one or more compliance rules 135. If the compliance status 137 indicates that the client device 106 or user is out of compliance with one or more compliance rules 135, the reservation service 120 can deny a reservation request 151 based upon the compliance status 137.

Figure 6:
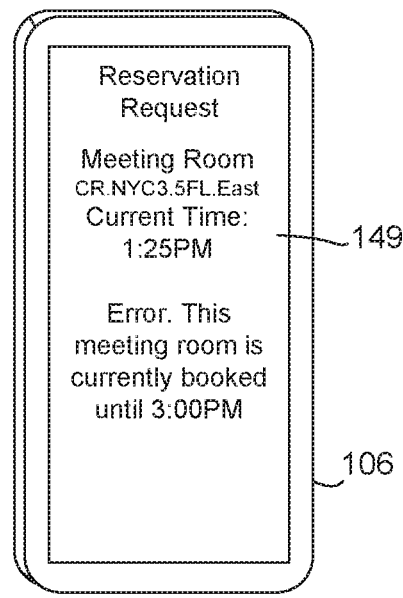

Continuing the example of FIG. 5, reference is now made to FIG. 6. FIG. 6 illustrates an example of how the reservation service 120 can generate a response to a reservation request that is displayed by the reservation application 149 when the requested physical resource 125 is already booked or reserved at a requested time. In the depicted example, the response rendered by the reservation application 149 can provide data that indicates when the requested physical resource 125 is available to be reserved.

Figure 7:
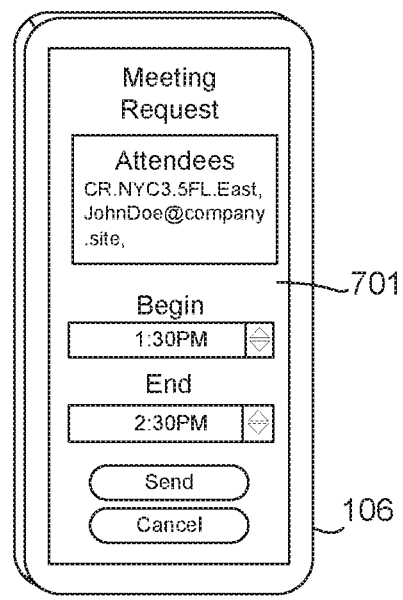

Referring next to FIG. 7, shown is an example of an alternative form of a reservation request that can be generated by the reservation application 149 upon scanning the physical identifier 153. In the example of FIG. 7, the reservation request can take the form of a meeting request that is created within a mail application 701 or calendar application installed on the client device 106. In this scenario, the reservation application 149 can utilize an intents application programming interface (API) that allows a meeting request or email message to be created and rendered in a default mail or calendar application on the client device 106 populated with certain variables.

In this case, the variables with which the email or meeting request can be populated include the directory service identifier 129 extracted from the physical identifier 153, a beginning time, or an ending time associated with a reservation request. In this way, the reservation request can be viewed or edited by the user using his or her preferred mail or calendar application, while the reservation application 149 obtains the physical identifier 153 and generates a draft email or calendar invitation that the user can send to the reservation service 120.

Figure 8:
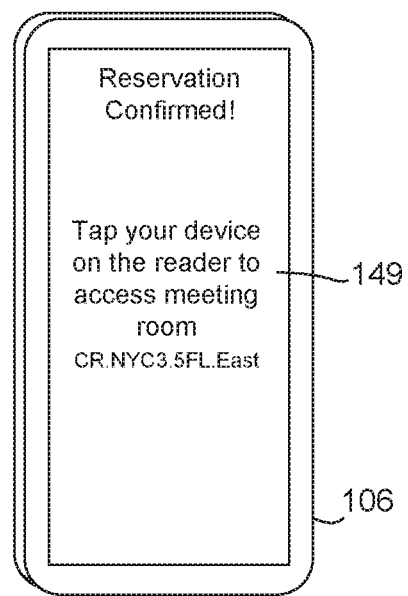

Reference is now made to FIG. 8, which depicts an example of how the reservation service 120 can provide a physical access credential 128 to the client device 106 or reservation application 149 in response to a reservation request. In the example of FIG. 8, in response to successfully reserving a physical resource 125 on behalf of a user, the reservation service 120 can obtain or generate a physical access credential 128 associated with the physical resource 125 that is provided to the client device 106. The client device 106 can present the physical access credential 128 to a door lock actuator or other security mechanism that secures access to the physical resource 125.

In some examples, the reservation service 120 can generate a physical access credential 128 that only allows access to the physical resource 125 during the time window for which the physical resource 125 is reserved for the user. The physical access credential 128 can include a token that can be presented to an RFID reader, an NFC reader, a barcode scanner, or any other input device that can facilitate security of the physical resource 125. In one example, the physical access credential 128 can include an alphanumeric token shown on the display of the client device 106 by the reservation application 149, which is then scanned by an optical scanner or camera associated with the physical resource 125 or keyed into a keyboard, voice recognition system, or touchscreen device associated with the physical resource device 107. Upon verification of the token, access to the physical resource 125 can be granted to the user.

Figure 9:
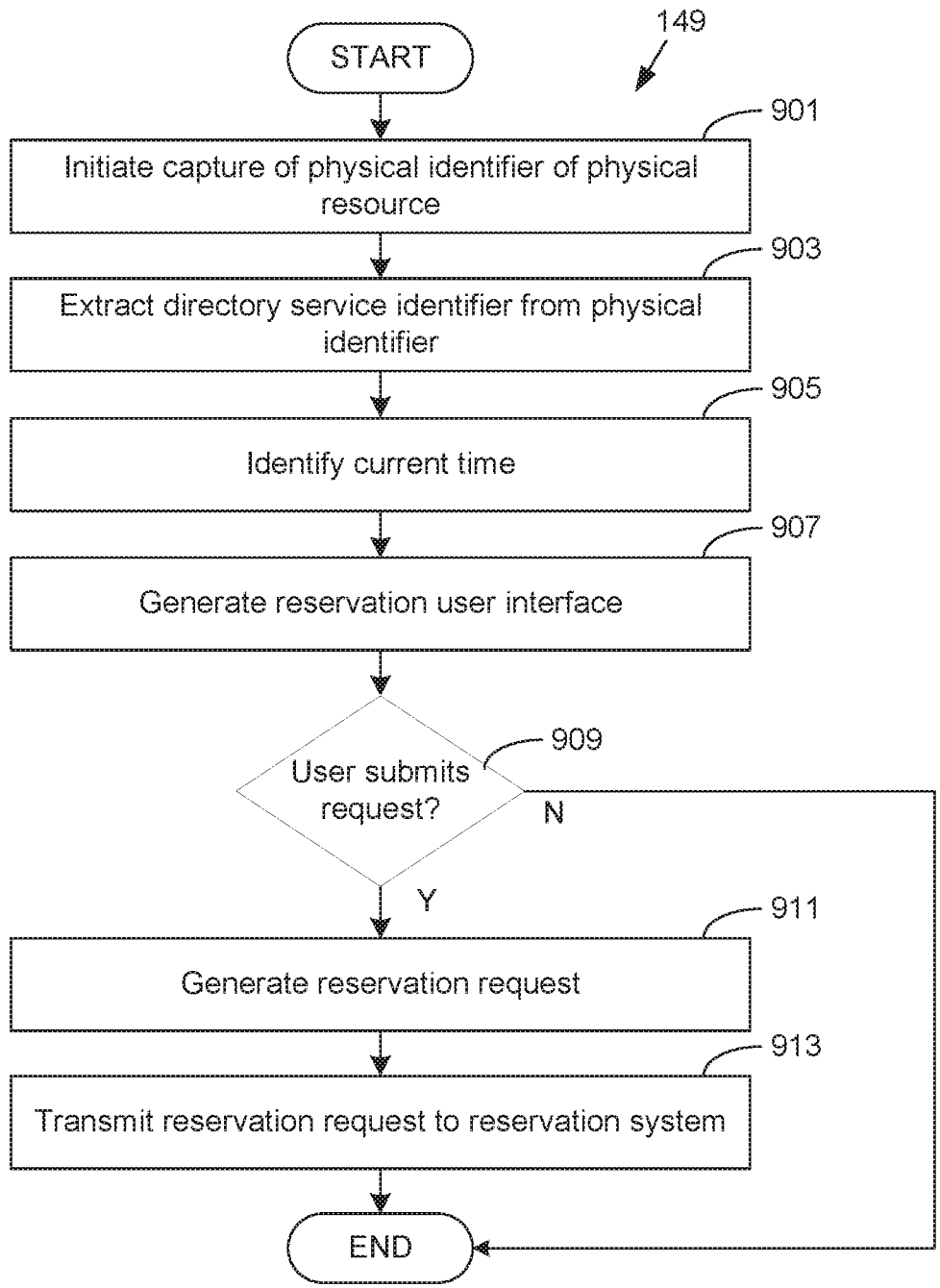
FIGS. 9-10 are flowcharts that illustrate functionality according to examples of the disclosure.

Referring to FIG. 9, shown is a flowchart that provides one example of how the reservation application 149 can generate a reservation request on behalf of a user attempting to reserve a physical resource 125 associated with an electronic record in a directory service 116.

Beginning at step 901, the reservation application 149 can initiate capture of a physical identifier 153 associated with the physical resource 125. The physical identifier 155 can include a barcode, an RFID tag, an NFC tag, or another device that can be affixed on or near a physical resource 125. The capture of the physical identifier 153 can be performed by the capture device 151 of the client device 106.

At step 903, the reservation application 149 can extract a directory service identifier 129 from the physical identifier 153. The directory service identifier 129 associated with the physical resource 125 can be embedded or encoded within the physical identifier 153 in encrypted or plaintext form. As noted above, the directory service identifier 129 corresponds to physical resource 125 within the directory service 116.

At step 905, the reservation application 149 can identify the current time or a current timestamp. The current time can be determined by querying a time API within the operating system of the client device 106. The current time can be used to identify one or more time values with which the reservation user interface is populated.

At step 907, the reservation application 149 can generate a reservation user interface. The reservation user interface can include user editable fields identifying a starting time and an ending time for a reservation request. The reservation user interface can also display identifying information associated with the physical resource 125 corresponding to the physical identifier 153.

At step 909, the reservation application 149 can determine whether the user submits a reservation request from the reservation user interface. If the user does not submit the reservation request by cancelling the request or exiting the application, the process can proceed to completion. If the user submits the reservation request from the reservation user interface, the process can proceed to step 911.

At step 911, the reservation application 149 can generate a reservation request. The reservation application 149 can include a start time and a duration. Alternatively, the reservation application 149 can include a start time and an end time. The reservation application 149 can also include a directory service identifier 129 or be sent to the directory service identifier 129, which can include an email address or other identifier that identifies the physical resource 125 within the directory service 116.

At step 913, the reservation application 149 can transmit the reservation request to the reservation service 120. The reservation application 149 can transmit the reservation request to the reservation service 120 by sending an email to an email address derived from or extracted from the directory service identifier 129. In some cases, the directory service identifier 129 can be the email address to which the reservation request is sent. In some implementations, the reservation application 149 can send the reservation request to the reservation service 120 by utilizing an API provided by the reservation service 120 through which reservation requests are received.

Figure 10:
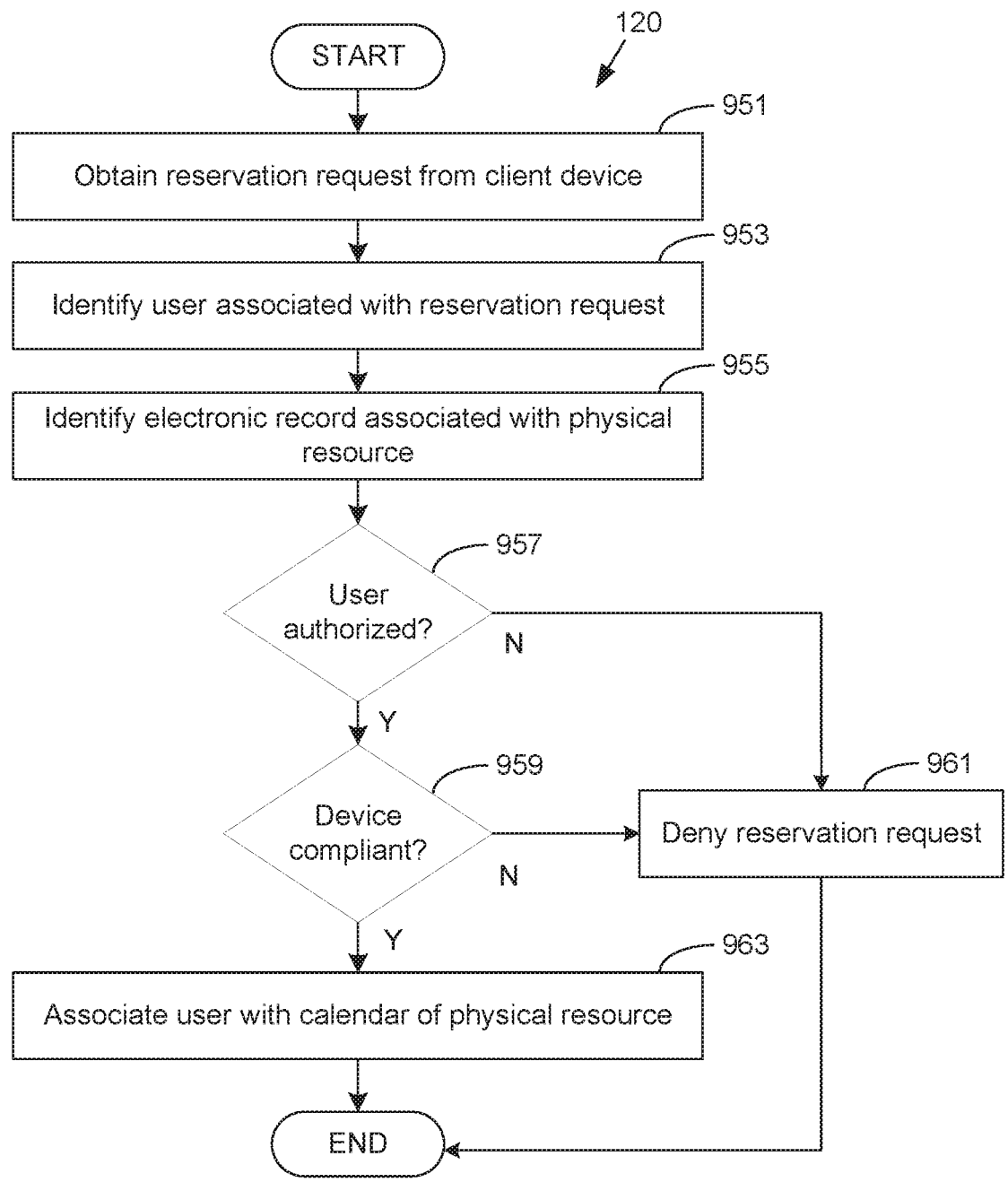

Referring next to FIG. 10, shown is a flowchart that provides one example of how the reservation service 120 can obtain and process a reservation request from the reservation application 149.

Beginning at step 951, the reservation service 120 can obtain or receive a reservation request from a reservation application 149 executed by the client device 106. The reservation request can be sent to a particular email address monitored by the reservation service 120 or an API on which the reservation service 120 is listening. The reservation request can reference a particular directory service identifier 129 within the directory service 116 associated with a particular physical resource 125 that the user is requesting to reserve.

At step 953, the reservation service 120 can identify a user associated with the reservation request. The reservation service 120 can identify the user by determining a sender email address or user identifier associated with the request.

At step 955, the reservation service 120 can identify an electronic record associated with a physical resource 125 associated with the directory service identifier 129. In one example, the directory service identifier 129 can map to a particular electronic record within the directory 123 that corresponds to a physical resource 125.

At step 957, the reservation service 120 can determine whether the requesting user is authorized to reserve the requested physical resource 125. The reservation service 120 determines whether the permissions 127 associated with the physical resource 125 authorize the user to reserve the physical resource 125. If the user is not authorized to reserve the physical resource 125, the process can proceed to step 961, where the reservation service 120 denies the reservation request. If the user is authorized to reserve the physical resource 125, the process proceeds to step 959.

At step 959, the reservation service 120 determines whether the client device 106 sending the reservation request is in compliance with one or more compliance rules 135. In one example, the reservation service 120 can identify the client device 106 based upon a device identifier or IP address embedded within the reservation request. The reservation service 120 can then communicate with the management service 121 to determine the compliance status 137 of the client device 106. If the client device 106 is not in compliance with one or more compliance rules 135, the process can proceed to step 961 and deny the reservation request. If the device is in compliance with one or more compliance rules 135, the process can proceed to step 963.

At step 963, if the physical resource 125 is available according to a calendar or schedule maintained by the directory service 116, the reservation service 120 can associate the calendar of the user with the calendar of the physical resource 125. In this way, the reservation service 120 has reserved the physical resource on behalf of the user. Thereafter, the process can proceed to completion.

The flowcharts of FIGS. 9-10 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 9-10 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, enterprise computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 121, reservation application 149, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for reserving a physical resource associated with an electronic record in a directory service comprising:
   a client device comprising a processor, memory, and a near-field communications (NFC) scanner; and
   machine readable instructions stored in the memory that, when executed by the processor, cause the client device to at least:
      extract, using the NFC scanner, a directory service identifier associated with the physical resource from an NFC tag associated with the physical resource;
      generate a reservation user interface associated with the physical resource, the reservation user interface comprising a user-selectable option associated with reservation of the physical resource;
      determine a compliance status for the client device;
      report the compliance status to a management service;
      generate a reservation request for the physical resource, the reservation request comprising an identity of a requesting user and the directory service identifier;
      transmit the reservation request to a reservation service associated with the physical resource, the reservation request being sent to a destination address based upon the directory service identifier; and
      obtain a response to the reservation request indicating that the physical resource has been reserved for the requesting user or cannot be reserved on behalf of the requesting user, wherein the response is based at least in part on the compliance status.

2. The system of claim 1, wherein the destination address comprises an email address with which the physical resource can be identified within the directory service.

3. The system of claim 1, wherein the machine readable instructions cause the client device to identify the destination address by querying the directory service with the directory service identifier.

4. The system of claim 1, wherein the reservation request comprises a meeting request to associate the electronic record within the directory service with the requesting user at a particular timestamp.

5. The system of claim 1, wherein the response comprises a physical access credential for the physical resource and the machine readable instructions are configured to present the physical access credential to an access credential reader associated with the physical resource.

6. The system of claim 5, wherein the physical access credential comprises a token that, when presented to a door lock actuator, releases a door lock associated with the physical resource.

7. The system of claim 1, wherein the client device is enrolled with the management service as a managed device.

8. A method for reserving a physical resource associated with an electronic record in a directory service comprising:

extracting, with a near-field communications (NFC) scanner, a directory service identifier associated with the physical resource from an NFC tag associated with the physical resource;

generating a reservation user interface associated with the physical resource, the reservation user interface comprising a user-selectable option associated with reservation of the physical resource;

determining a compliance status for the client device;

reporting the compliance status to a management service;

generating a reservation request for the physical resource, the reservation request comprising an identity of a requesting user and the directory service identifier;

transmitting the reservation request to a reservation service associated with the physical resource, the reservation request sent to a destination address based upon the directory service identifier; and obtaining a response to the reservation request indicating that the physical resource has been reserved for the requesting user or cannot be reserved on behalf of the requesting user, wherein the response is based at least in part on the compliance status.

9. The method of claim 8, wherein the destination address comprises an email address with which the physical resource can be identified within the directory service.

10. The method of claim 8, wherein identifying the destination address further comprises querying the directory service with the directory service identifier.

11. The method of claim 8, wherein the reservation request comprises a meeting request to associate the electronic record within the directory service with the requesting user at a particular timestamp.

12. The method of claim 8, wherein the response comprises a physical access credential for the physical resource and the method further comprises presenting the physical access credential to an access credential reader associated with the physical resource.

13. The method of claim 12, wherein the physical access credential comprises a token that, when presented to a door lock actuator, releases a door lock associated with the physical resource.

14. The method of claim 8, wherein a client device is enrolled with a management service as a managed device.

15. A non-transitory computer-readable medium comprising machine-readable instructions for reserving a physical resource, wherein when executed by a processor of at least one computing device, the machine-readable instructions cause the at least one computing device to at least:

extract, using a near-field communications (NFC) scanner, a directory service identifier associated with the physical resource from an NFC tag associated with the physical resource;

generate a reservation user interface associated with the physical resource, the reservation user interface comprising a user-selectable option associated with reservation of the physical resource;

determine a compliance status for the computing device;

report the compliance status to a management service;

generate a reservation request for the physical resource, the reservation request comprising an identity of a requesting user and the directory service identifier;

transmit the reservation request to a reservation service associated with the physical resource, the reservation request sent to a destination address based upon the directory service identifier; and obtain a response to the reservation request indicating that the physical resource has been reserved for the requesting user or cannot be reserved on behalf of the requesting user, wherein the response is based at least in part on the compliance status.

16. The non-transitory computer-readable medium of claim 15, wherein the destination address comprises an email address with which the physical resource can be identified within the directory service.

17. The non-transitory computer-readable medium of claim 15, wherein the machine-readable instructions identify the destination address by querying the directory service with the directory service identifier.

18. The non-transitory computer-readable medium of claim 15, wherein the reservation request comprises a meeting request to associate a schedule of the physical resource within the directory service with the requesting user at a particular timestamp.

19. The non-transitory computer-readable medium of claim 15, wherein the response comprises a physical access credential for the physical resource and the machine-readable instructions present the physical access credential to an access credential reader associated with the physical resource.

20. The non-transitory computer-readable medium of claim 19, wherein the physical access credential comprises a token that, when presented to a door lock actuator, releases a door lock associated with the physical resource.

* * * * *